United States Patent
Sun et al.

(10) Patent No.: US 12,314,260 B2
(45) Date of Patent: May 27, 2025

(54) RECOMMENDATIONS FOR CHANGES IN DATABASE QUERY PERFORMANCE

(71) Applicant: INTERNATIONAL BUSINESS MACHINES CORPORATION, Armonk, NY (US)

(72) Inventors: Sheng Yan Sun, Beijing (CN); Peng Hui Jiang, Beijing (CN); Xiao Feng Meng, Beijing (CN); Xu Qin Zhao, Beijing (CN); Ye Tao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/376,489

(22) Filed: Oct. 4, 2023

(65) Prior Publication Data

US 2025/0117383 A1    Apr. 10, 2025

(51) Int. Cl.
*G06F 16/24* (2019.01)
*G06F 16/242* (2019.01)
*G06F 16/2453* (2019.01)

(52) U.S. Cl.
CPC .... *G06F 16/24542* (2019.01); *G06F 16/2423* (2019.01)

(58) Field of Classification Search
CPC .......... G06F 16/24542; G06F 16/2423
See application file for complete search history.

(56) References Cited

U.S. PATENT DOCUMENTS

| | | | |
|---|---|---|---|
| 9,946,780 B2 | 4/2018 | Gerweck et al. | |
| 10,762,085 B2 * | 9/2020 | Tariq | G06F 16/24544 |
| 2016/0140177 A1 * | 5/2016 | Chamberlin | G06F 16/2455 |
| | | | 707/717 |
| 2017/0185663 A1 | 6/2017 | Gerweck et al. | |
| 2022/0269686 A1 | 8/2022 | Bordawekar et al. | |
| 2023/0169078 A1 * | 6/2023 | Rogers | G06N 5/01 |
| | | | 707/692 |
| 2024/0311380 A1 * | 9/2024 | Interlandi | G06F 16/24569 |

FOREIGN PATENT DOCUMENTS

| | | |
|---|---|---|
| CN | 110008237 | 7/2019 |
| CN | 114443691 | 5/2022 |

* cited by examiner

*Primary Examiner* — Loc Tran
(74) *Attorney, Agent, or Firm* — Jared Chaney; Andrew D. Wright; Calderon Safran & Wright P.C.

(57) ABSTRACT

Embodiments analyze an incoming query for a database, train a query model using machine learning based on the analyzing of the incoming query, determine a model result based on the trained query model; extract a similar information query based on the model result, generate a recommendation for query tuning and a visual impact of the recommendation for the query tuning based on the extracting of the similar information query, and output the recommendation for the query turning and the visual impact of the recommendation for the query tuning.

20 Claims, 6 Drawing Sheets

RECOMMENDATIONS FOR CHANGES IN DATABASE QUERY PERFORMANCE

BACKGROUND

Aspects of the present invention relate generally to recommendations and, more particularly, to recommendations for changes in database query performance.

In database applications, existing tools may help to generate customer analytics with regards to query performance. In an example, the existing tools may generate a summary or a description of optimization rules.

SUMMARY

In a first aspect of the invention, there is a computer-implemented method including: analyzing, by a processor set, an incoming query for a database; training, by the processor set, a query model using machine learning based on the analyzing of the incoming query; determining, by the processor set, a model result based on the trained query model; extracting, by the processor set, a similar information query based on the model result; generating, by the processor set, a recommendation for query tuning and a visual impact of the recommendation for the query tuning based on the extracting of the similar information query; and outputting, by the processor set, the recommendation for the query turning and the visual impact of the recommendation for the query tuning.

In another aspect of the invention, there is a computer program product including one or more computer readable storage media having program instructions collectively stored on the one or more computer readable storage media. The program instructions are executable to: analyze an incoming query for a database; train a query model using machine learning based on the analyzing of the incoming query; determine a model result based on the trained query model; extract a similar information query based on the model result; generate a recommendation for query tuning and a visual impact of the recommendation for the query tuning based on the extracting of the similar information query; and output the recommendation for the query turning and the visual impact of the recommendation for the query tuning.

In another aspect of the invention, there is a system including a processor set, one or more computer readable storage media, and program instructions collectively stored on the one or more computer readable storage media. The program instructions are executable to: analyze an incoming query for a database; train a query model using machine learning based on the analyzing of the incoming query; determine a model result based on the trained query model; modify an explain information query based on the model result; generate a recommendation for query tuning and a visual impact of the recommendation for the query tuning based on the extracting of the modified explain information query; and output the recommendation for the query turning and the visual impact of the recommendation for the query tuning.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to recommendations and, more particularly, to recommendations for changes in database query performance. Embodiments of the present invention provide recommendations of changes to a database query to improve query performance and display an impact of the recommendations. Embodiments of the present invention store and share interpretation information corresponding to database query statements which are related to query performance optimization in a hybrid cloud environment. In particular, aspects of the present invention improve analysis efficiency and query tuning performance by utilizing a comprehensive report corresponding to the stored and shared interpretation information. Embodiments of the present invention perform query input analytics by collecting and analyzing database information and statistics of a database catalog, parameter statistics, and activities to determine performance related values.

Embodiments of the present invention also perform query input analytics by utilizing a query normalization using a parse structure. Embodiments of the present invention perform data node environment analytics using a hybrid-cloud database node-based information structure and analytics related to business-related information between each node of the hybrid-cloud database node-based information structure. Embodiments of the present invention also perform an explain query with a multiple perspective performance tuning measurement by utilizing an explain query and performance measurement perspective graph between an original query and a query performance improvement recommendation. Embodiments of the present invention provide a measurement and transformation between different data nodes. In particular, aspects of the present invention account for different access paths and performance between the different data nodes. Embodiments of the present invention also provide a hybrid-cloud database node-based perspective.

Embodiments of the present invention provide a computer-implemented method, a system, and a computer program product for providing a recommendation to improve query performance and displaying an impact of the recommendation. In contrast, conventional systems provide a summary or description of current optimization rules. Embodiments of the present invention provide query tuning recommendations which improve query performance based on statistics and activity collection and display an impact of the query tuning recommendations.

Embodiments of the present invention include a highly computationally efficient system, method, and computer program product for providing query tuning recommendations. Accordingly, implementations of the present invention provide an improvement (i.e., technical solution) to a problem arising in the technical field of database query performance. In particular, embodiments of the present invention perform statistics and activity collection which helps to improve the query tuning recommendations. Also, embodiments of the present invention may not be performed in the human mind because aspects of the present invention build and train a machine learning (ML) model to improve query tuning recommendations by utilizing statistics and activity collection of the incoming query. Further, these implementations of the present invention refine the ML model based on different database node structures within the cloud environment. In addition, implementations of the present invention share query tuning recommendations among different nodes within the cloud environment in real-time or near real-time. Also, the ML model is dynamically updated and trained based upon the statistics and activity collection of the incoming query to provide the query tuning recommendations in real-time or near real-time.

Implementations of the present invention are necessarily rooted in computer technology. For example, the step of training a query model using machine learning based on an analysis of an incoming query for a database is computer-based and cannot be performed in the human mind. Training and building the query model by machine learning is, by definition, performed by a computer and cannot practically be performed in the human mind (or with pen and paper) due to the complexity and massive amounts of calculations involved. For example, training the query model in embodiments of the present invention may use machine learning to train a query using at least one of a classification machine learning system, a support vector machine learning system, and a structured query language (SQL) machine learning system. In particular, training the query model using machine learning in embodiments of the present invention performs a large amount of processing of current and past query data and modeling of parameters to train the query model such that the query model generates a model result in real time (or near real time). Given the scale and complexity of processing current and past query data and modeling of parameters, it is simply not possible for the human mind, or for a person using pen and paper, to perform the number of calculations involved in training and/or building the query model.

Aspects of the present invention include a method, system, and computer program product for providing recommendations to improve database query performance. For example, a computer-implemented method includes: performing query input analytics; perform data node environment analytics; provide performance query recommendation based on the query input analytics and the data node environment analytics; displaying the performance recommendation; and provide the query performance recommendation to different nodes within a hybrid-cloud environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
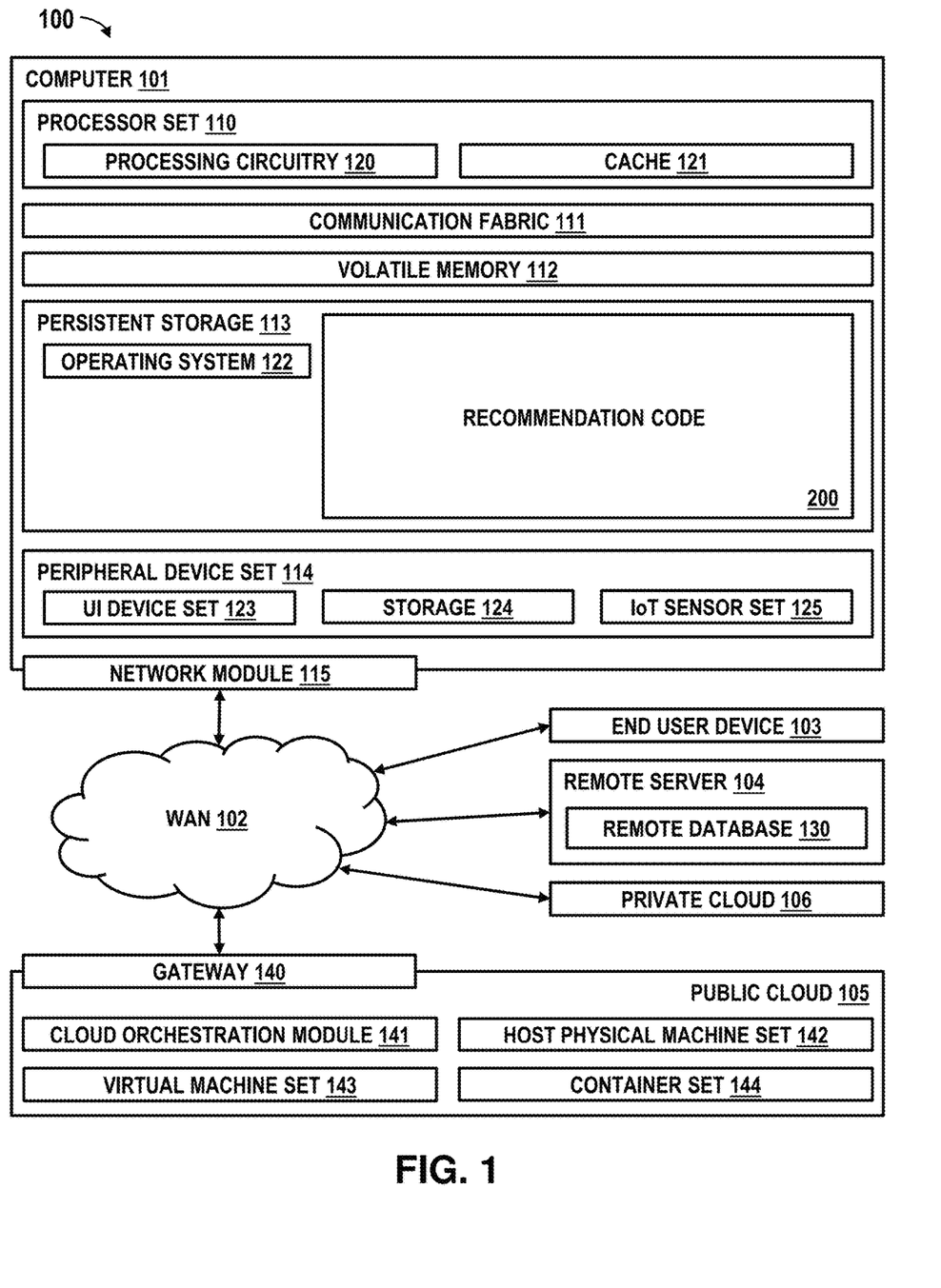
FIG. 1 depicts a computing environment according to an embodiment of the present invention.

Computing environment 100 contains an example of an environment for the execution of at least some of the computer code involved in performing the inventive methods, such as recommendation code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
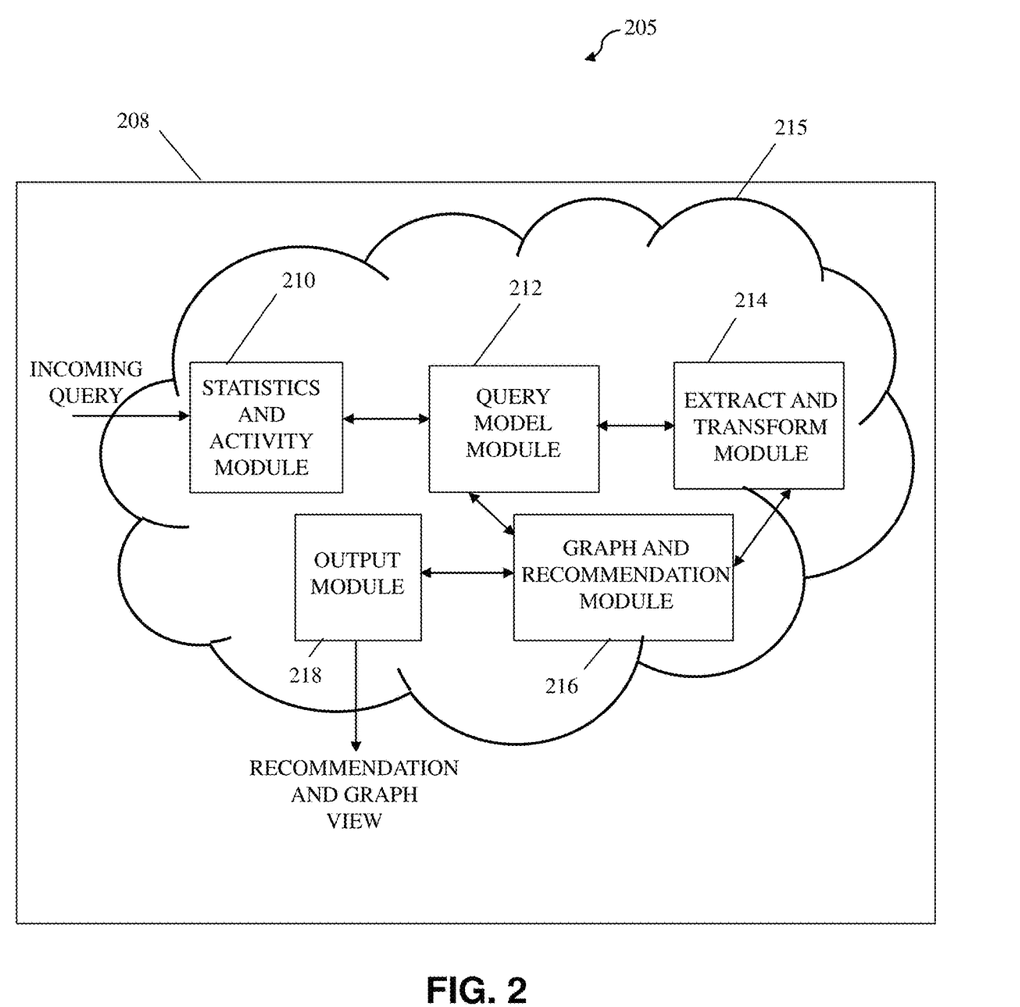
FIG. 2 shows a block diagram of an exemplary environment in accordance with aspects of the present invention.

FIG. 2 shows a block diagram of an exemplary environment 205 in accordance with aspects of the present invention. In embodiments, the environment 205 includes a recommendation server 208, which may comprise one or more instances of the computer 101 of FIG. 1. In other examples, the recommendation server 208 comprises one or more virtual machines or one or more containers running on one or more instances of the computer 101 of FIG. 1.

In embodiments, the recommendation server 208 of FIG. 2 comprises a statistics and activity module 210, a query model module 212, an extract and transform module 214, a graph and recommendation module 216, and an output module 218, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The recommendation server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the present invention, an incoming query for a database from a user device that communicates with a cloud-based system 215 which includes the statistics and activity module 210, the query model module 212, the extract and transform module 214, the graph and recommendation module 216, and the output module 218. In further embodiments, the output module 218 outputs the recommendation and the graph view to a graphical user interface (GUI) of the user device. However, embodiments are not limited to this example, and the user device may also be included in the cloud-based system 215.

In FIG. 2, and in accordance with aspects of the present invention, the statistics and activity module 210 receives the incoming query for the database from the user device. In embodiments, the statistics and activity module 210 collects and analyzes database information and statistics from a database catalog, parameter statistics, activities, etc., of the incoming query. In particular, the statistics and activity module 210 analyzes the incoming query to determine performance related values based on the database information and statistics from a database catalog, parameter statistics, activities, etc., of the incoming query. In embodiments, the statistics and activity module 210 collects an input data sample $\vec{x}$ as shown in Equation 1 below:

$$\vec{x} = x_1, x_2, \ldots, x_n \quad \text{(Equation 1)}.$$

In embodiments of FIG. 2, a corresponding frequency weight of the input data sample $\vec{x}$ is denoted as $w_1$, $w_2, \ldots, w_n$ and a total effective sample size is $W = \Sigma_{i=1}^{n} w_i$. In embodiments, the statistics and activity module 210 calculates a probability mass function of the input data sample $\vec{x}$ as shown in Equation 2 below:

$$\text{Bin}(x;N,P) = \binom{N}{x} P^x (1-P)^{N-x}, \text{ for } x=0,1,\ldots,N. \quad \text{(Equation 2)}.$$

In embodiments of Equation 2 above, x represents the input data sample, N represents a number of the last input data sample, and P represents a confidence degree of similarity. In embodiments of FIG. 2, the statistics and activity module 210 also calculates a categorical distribution for a monomial distribution as shown in Equation 3 below:

$$\text{Categorical } (x_i; P_1, \ldots, P_J) = \prod_{j=1}^{J} P_j^{x_{i,j}}, \text{ with} \quad \text{(Equation 3)}$$

$$\sum_{j=1}^{J} P_j = 1.$$

In embodiments of Equation 3, $P_j$ represents a vector of probabilities, J represents a total number of items, and $x_i$ represents the input data sample. In embodiments of FIG. 2, the statistics and activity module 210 uses Equations 1, 2, and 3 above in collecting and analyzing database information and statistics from a database catalog, parameter statistics, activities, etc., of the incoming query. In embodiments of FIG. 2, the statistics and activity module 210 also calculates node and business similarity based on query normalization and statistics distribution of the incoming query. For example, the statistics and activity module 210 may normalize each query feature of the incoming query as a vector to calculate similarity with different input data (e.g., sample like prepared-statement). In particular, the statistics and activity module 210 calculates a similarity using a parsing tree. Also, the statistics and activity module 210 can use a different data access path and execute structure for a different data distribution with a same query structure. Therefore, the statistics and activity module 210 performs query input analytics and data node environment analytics.

In embodiments of FIG. 2, the statistics and activity module 210 performs analytics for query normalization using a predicate analyzer, a foreign key, a structured query language (SQL) mutate, a SQL parsing tree, a pattern sorting by sorting the SQL by a different pattern, a mutation pattern using at least one of a simple mutation pattern, a sub-query, a having clause, generating SQLs using at least one of an extract join predicate, a reconstruct SQL, a sample result set, etc. In embodiments, the statistics and activity module 210 performs analytics with respect to the query normalization for cross business-related query activities and not just on a single database. In particular, the statistics and activity module 210 analyzes and mines a model result and groups and shares a query (or query block) among different nodes for a multi-tenant cluster or a hybrid cloud. The statistics and activity module 210 sends the database information and statistics from the database catalog, the parameter statistics, activities, the performance related values, the probability mass function, the categorical distribution, the node and business similarity, the normalized query features, the analytics for the query normalization and cross business-related query, etc., of the incoming query to the query model module 212.

In embodiments of FIG. 2, the query model module 212 builds and trains a query model using machine learning based on the database information and statistics from the database catalog, the parameter statistics, activities, the performance related values, the probability mass function, the categorical distribution, the node and business similarity, the normalized query features, the analytics for the cross business-related query, etc., of the incoming query. In embodiments, the query model module 212 builds and trains the query model using machine learning by training a classification machine learning system using a classification algorithm. In further embodiments, the query model module 212 builds and trains the query model using machine learning by training a support vector machine learning system using a vector algorithm. In other embodiments, the query model module 212 builds and trains the query model using machine learning by training a SQL machine learning system using a SQL algorithm which includes the analytics for query normalization based on the predicate analyzer, the foreign key, the SQL mutate, the SQL parsing tree, the pattern sorting by sorting the SQL by the different pattern, the mutation pattern using at least one of the simple mutation pattern, the sub-query, the having clause, the generated SQLs using the at least one of the extract join predicate, the reconstruct SQL, the sample result set, the mutate SQL, etc. The query model module 212 determines a model result based on the query model being built and trained by at least one of the classification machine learning system, the support vector machine learning system, and the SQL machine learning system. In embodiments, the model result is a data representation of the incoming query which can be used to compare the incoming query to a similar query, a similar query block, or a similar explain information query with similar distribution information stored in an existing database. In embodiments, the explain information provides information about how SQL executes statements within a database. Thus, the similar explain information query with similar distribution has similar information about how the SQL executes statements and similar distribution information as the incoming query. In embodiments, the query model module 212 sends the model result to the extract and transform module 214 for extracting the similar query, the similar query block, or the similar explain information query with similar distribution information.

In FIG. 2, and in accordance with aspects of the present invention, the extract and transform module 214 receives the model result from the query model module 212. The extract and transform module 214 searches for a similar information query. In particular, the extract and transform module 214 searches for a similar query, a similar query block, or a similar explain information query with similar distribution information stored in an existing database to the model result. Once the extract and transform module 214 finds at least one of the similar query, the similar query block, and the similar explain information query stored in the existing database, the extract and transform module 214 extracts the at least one of the similar query, the similar query block, and the similar explain information query stored in the existing database.

In embodiments of FIG. 2, the extract and transform module 214 then sends the extracted at least one of the similar query, the similar query block, and the similar explain information query to the graph and recommendation module 216 in response to at least one of the similar query, the similar query block, and the similar explain information query having a same distribution information as the model result. In other embodiments, the extract and transform module 214 modifies the explain information query (i.e., re-explains the explain information query) of the at least one of the similar query, the similar query block, and the similar explain information query to be the same as the model result in response to the at least one of the similar query, the similar query block, and the similar explain information query having a similar distribution information (but not a same distribution information) as the model result. The extract and transform module 214 then sends the modified explain information query to the graph and recommendation module 216. The extract and transform module 214 then shares the modified explain information query (i.e., re-explains the explain information query) to the rest of the system (e.g., other nodes and/or other databases) so that the system is refreshed with the modified explain information query. In embodiments, the modifying the explain information query (i.e., re-explains the explain information query) modifies (i.e., re-explains) an information query which doesn't have any existing information.

In embodiments of FIG. 2, the graph and recommendation module 216 receives at least one of the similar query, the similar query block, and the similar explain information query and the modified explain information query and generates a recommendation for a query tuning action based on the at least one of the similar query, the similar query block, and the similar explain information query and the modified explain information query. In embodiments, the graph and recommendation module 216 also generates a visual impact of the recommendation for the query tuning. The graph and recommendation module 216 then sends the recommendation for the query tuning and the visual impact of a graph view of the recommendation for the query tuning to an output module 218.

In embodiments of FIG. 2, the output module 218 receives the recommendation for the query tuning and the visual impact of the graph view of the recommendation for the query tuning. The output module 218 then outputs the recommendation for the query tuning and the visual impact of the graph view of the recommendation for the query tuning to the user device for displaying in a graphical user interface (GUI) of the user device. Details of the virtual impact of the graph view of the recommendation for the query tuning will be described with respect to FIGS. 5 and 6.

Figure 3:
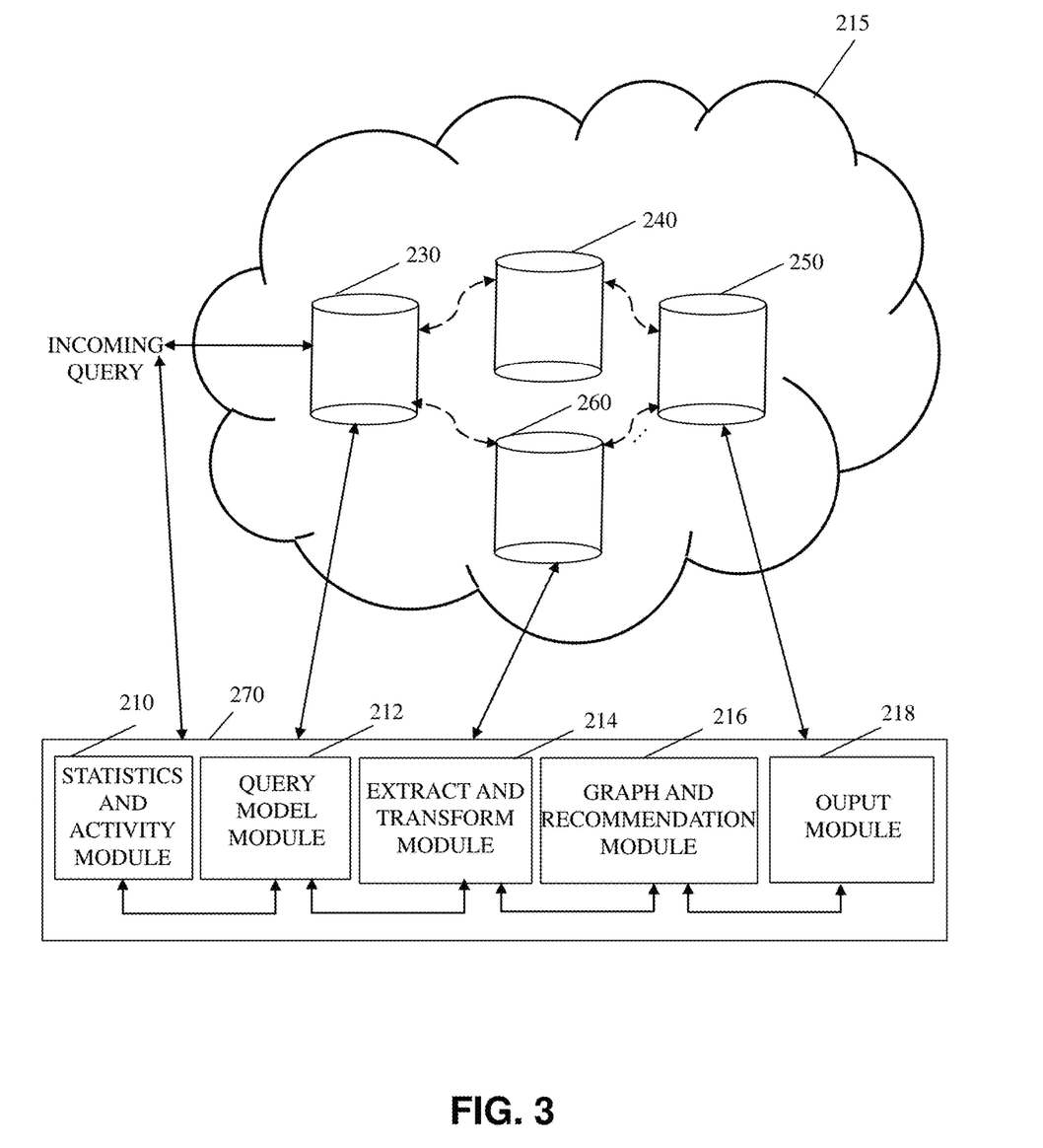
FIG. 3 shows a block diagram of another exemplary environment in accordance with aspects of the present invention.

FIG. 3 shows a block diagram of another exemplary environment in accordance with aspects of the present invention. In FIG. 3, the cloud-based system 215 is a cross hybrid database which includes a first node 230, a second node 240, a third node 250, . . . , and a nth node 260 (n being an integer which represents the number of nodes). In embodiments, each of the first node 230, the second node 240, the third node 250, . . . , and the nth node 260 includes at least one database. In FIG. 3, the incoming query for the database from the user device is sent to the first node 230. A cluster computing server 270 which includes the statistics and activity module 210, the query model module 212, the extract and transform module 214, the graph and recommendation module 216, and the output module 218 (as described in FIG. 2) also communicates with the incoming query, the first node 230, the third node 250, and the nth node 260.

In FIG. 3, and in accordance with aspects of the present invention, the first node 230 receives the recommendation for the query tuning and the visual impact of the graph view of the recommendation for the query tuning from the output module 218. Also, in FIG. 3, the first node 230 shares the recommendation for the query tuning and the visual impact of the graph view of the recommendation for the query tuning with the second node 240 so that the second node 240 also gains the benefit of the recommendation for the query tuning. The second node 240 shares the recommendation for the query tuning and the visual impact of the graph view of the recommendation for the query tuning with the third node 250 for similar reasons. The third node 250 shares the recommendation for the query tuning and the visual impact of the graph view of the recommendation for the query tuning with the next node, and so on until the nth node 260 receives the recommendation for the query tuning and the visual impact of the graph view of the recommendation for the query tuning. Thus, all of the nodes (e.g., nodes 230, 240, 250, . . . , 260) in the cloud-based system 215 will have the recommendation for the query tuning and the visual impact of the graph view of the recommendation for the query tuning of the recommendation server 208.

Figure 4:
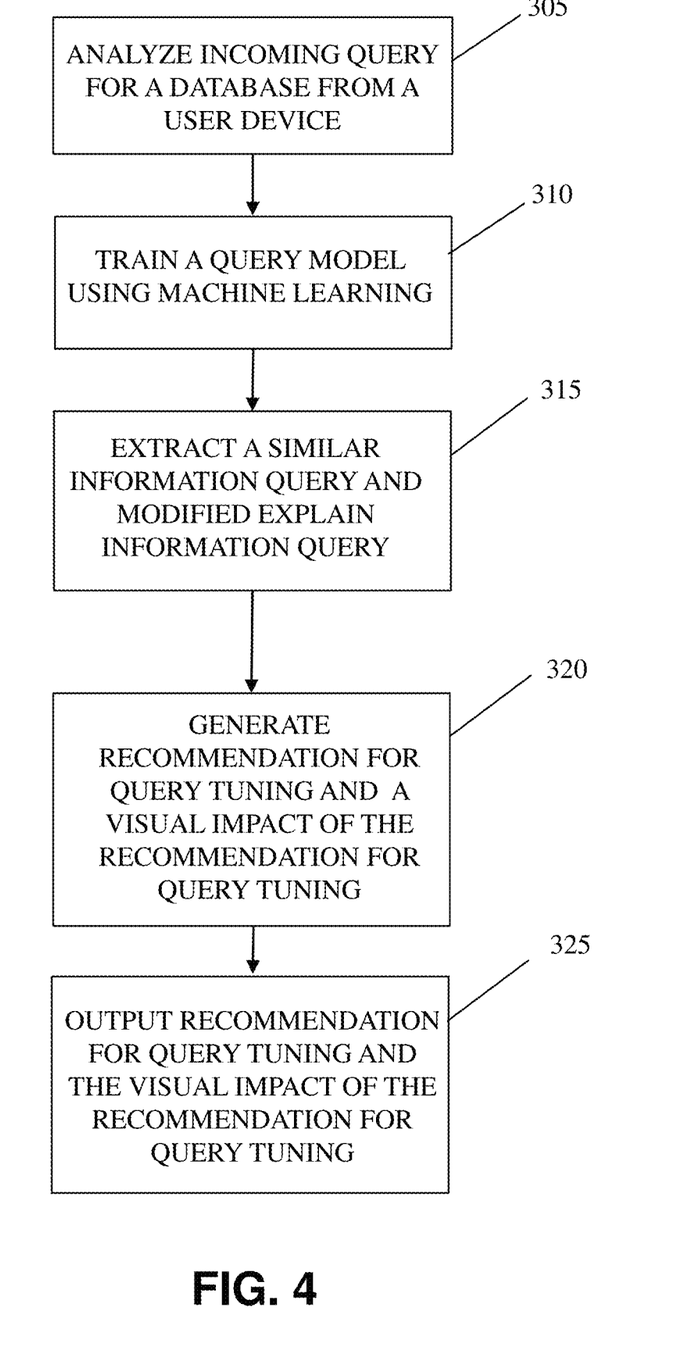
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

In embodiments of FIG. 4, at step 305, the system analyzes, at the statistics and activity module 210, an incoming query for a database from a user device. In embodiments and as described with FIG. 2, the statistics and activity module 210 collects and analyzes database information and statistics from a database catalog, parameter statistics, activities, etc., of the incoming query. The statistics and activity module 210 sends the database information and statistics from the database catalog, the parameter statistics, activities, the performance related values, the probability mass function, the categorical distribution, the node and business similarity, the normalized query features, the analytics for the query normalization and cross business-related query, etc., of the incoming query to the query model module 212.

At step 310, the system trains, at the query model module 212, a query model using machine learning based on the database information and statistics from the database catalog, the parameter statistics, activities, the performance related values, the probability mass function, the categorical distribution, the node and business similarity, the normalized query features, the analytics for the query normalization and cross business-related query, etc., of the incoming query. In embodiments and as described with FIG. 2, the query model module 212 determines a model result based on the query model being built and trained by at least one of a classification machine learning system, a support vector machine learning system, and a SQL machine learning system. The query model module 212 sends the model result to the extract and transform module 214.

At step 315, the system extracts, at the extract and transform module 214, a similar information query and a modified explain information query. In embodiments and as described with FIG. 2, the extract and transform module 214 extracts at least one of the similar query, the similar query block, and the similar explain information query in response to the at least one of the similar query, the similar query block, and the similar explain information query having a same distribution information as the model result. In other embodiments, the extract and transform module 214 modifies the explain information query (i.e., re-explain the explain information query) of the at least one of the similar query, the similar query block, and the similar explain information query to be the same as the model result in response to the at least one of the similar query, the similar query block, and the similar explain information query having a similar distribution information (but not a same distribution information) as the model result. The extract and transform module 214 then sends the at least one of the similar query, the similar query block, and the similar explain information query, and the modified explain information query to the graph and recommendation module 216.

At step 320, the system generates, at the graph and recommendation module 216, a recommendation for a query tuning action and a visual impact of the recommendation for the query tuning action based on the at least one of the similar query, the similar query block, and the similar explain information query, and the modified explain information query. In embodiments and as described with FIG. 2, the graph and recommendation module 216 sends the recommendation for the query tuning action and the visual impact of the recommendation for the query tuning action to the output module 218.

At step 325, the system outputs, at the output module 218, the recommendation for the query tuning and the visual impact of the graph view of the recommendation for the query tuning. In embodiments, and as described with FIG. 2, the output module 218 outputs the recommendation for the query tuning and the visual impact of the graph view of the recommendation for the query tuning to a user device for displaying in a graphical user interface (GUI) of the user device.

Figure 5:
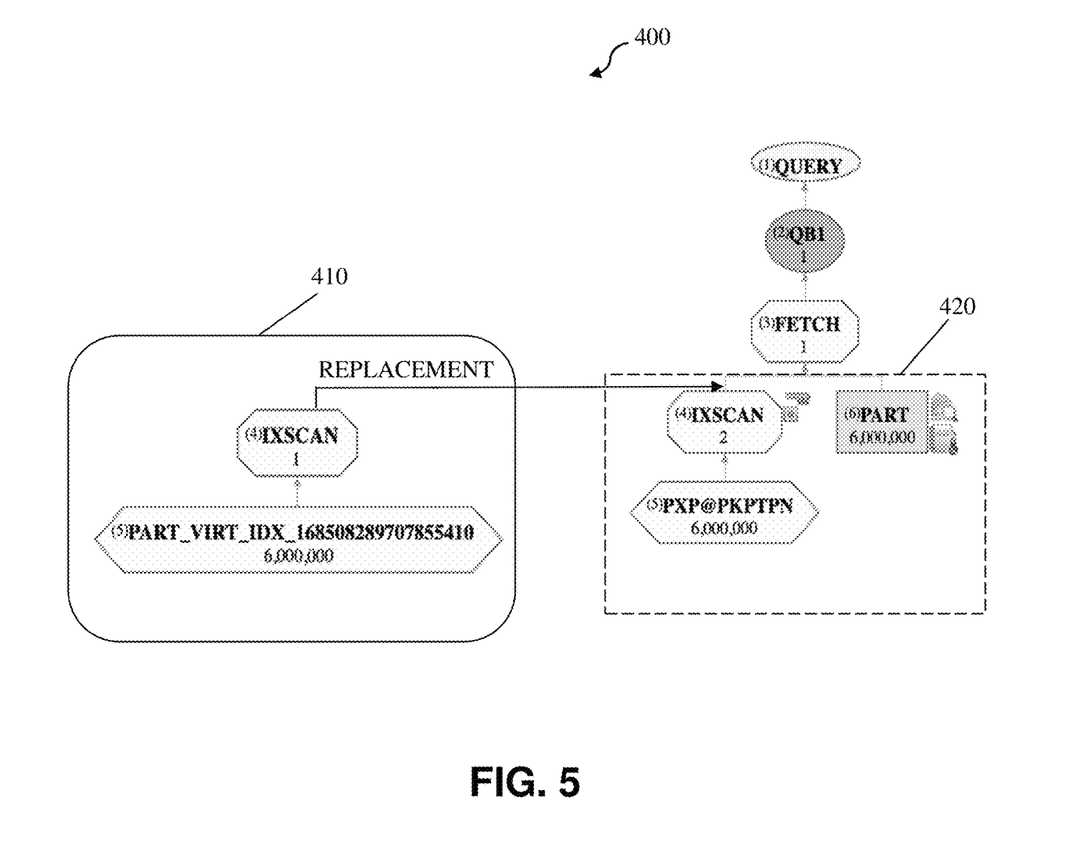
FIG. 5 shows an example of the visual impact of the recommendation in accordance with aspects of the present invention.

FIG. 5 shows an example of the visual impact of the recommendation in accordance with aspects of the present invention. In embodiments of FIG. 5, the visual impact 400 of the recommendation includes a recommendation 410 to query tuning and an original query 420. In the original query 420, an index name ("PXP@PKPTPN 6,000,000") is input to an index scan ("IXSCAN 2") which finds the part in a data path ("PART 6,000,000"). The index scan and the part are then fetched ("FETCH") and sent to a query block ("QB1"). The query block ("QB1") is then used as an input to a query ("QUERY"). In embodiments, and as described with FIG. 2, the graph and recommendation module 216 generates the recommendation 410 to the query tuning. In FIG. 5, the recommendation 410 creates a new index ("PART_VIRT_IDX 168508289707855410") for improved query performance. The new index is then input to another index scan ("IXSCAN 1"). In FIG. 5, the recommendation 410 with the new index ("PART_VIRT_IDX_168508289707855410") and the another index scan ("IXSCAN 1") replaces the original query 420 which includes the index name ("PXP@PKPTPN 6,000,000") and the index scan ("IXSCAN 2") for finding the part in the data path ("PART 6,000,000"). Accordingly, by utilizing the recommendation 410, the system improves query performance in comparison to the original query 420.

Figure 6:
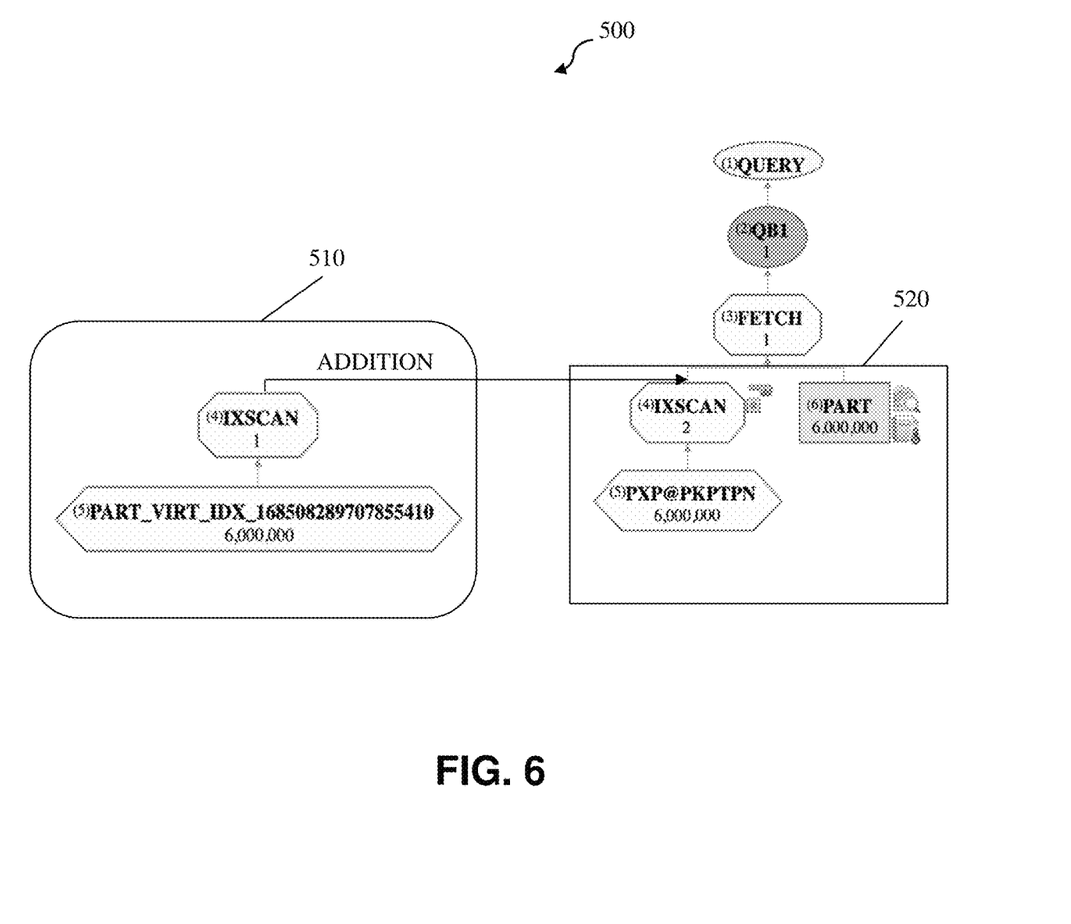
FIG. 6 shows an example of the visual impact of the recommendation in accordance with aspects of the present invention.

FIG. 6 shows an example of the visual impact of the recommendation in accordance with aspects of the present invention. FIG. 6 includes a visual impact 500 of the recommendation and is similar to FIG. 5, with the exception that a recommendation 510 is used in addition to an original query 520. As an example, the recommendation 510 is appended to the original query 520 by using the command CREATE INDEX "USRT001", "PART_VIRT_IDX 168508289707855410" ON "USRT001", "PART" ("P_NAME" ASC, "P_TYPE" ASC) NOT PADDED FREEPAGE 0 PCTFREE 10 for finding the part in the data path ("PART 6,000,000").

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
analyzing, by a processor set, an incoming query for a database;
training, by the processor set, a query model using machine learning based on the analyzing the incoming query;
determining, by the processor set, a model result based on the trained query model;
extracting, by the processor set, a similar information query based on the model result;
generating, by the processor set, a recommendation for query tuning and a visual impact of the recommendation for the query tuning based on the extracting of the similar information query; and
outputting, by the processor set, the recommendation for the query tuning and the visual impact of the recommendation for the query tuning,
wherein the visual impact comprises a graphical user interface (GUI) which includes an index scan, an index name, and a part in a data path of the incoming query and a new index and another index scan of the recommendation for the query.

2. The computer-implemented method of claim 1, wherein the extracting further comprises extracting the at least one selected from a group consisting of a similar query, a similar query block, and a similar explain information query based on the at least one selected from the group consisting of the similar query, the similar query block, and the similar explain information query having a same distribution as the model result, and the training further comprises training the query model using machine learning based on the query model being built and trained by a structured query language (SQL) machine learning system using a SQL algorithm.

3. The computer-implemented method of claim 2, wherein the analyzing further comprises analyzing database information and statistics from a database catalog, parameter statistics, and activities of the incoming query, and the SQL algorithm uses analytics for query normalization based on a SQL mutate.

4. The computer-implemented method of claim 1, wherein the training further comprises training the query model using machine learning based on the query model being built and trained by at least one selected from a group consisting of a classification machine learning system, a support vector machine learning system, and a structured query language (SQL) machine learning system.

5. The computer-implemented method of claim 4, wherein the training further comprises training the query model using machine learning based on the query model being built and trained by the classification machine learning system using a classification algorithm.

6. The computer-implemented method of claim 4, wherein the training further comprises training the query model using machine learning based on the query model being built and trained by the vector machine learning system using a vector algorithm.

7. The computer-implemented method of claim 4, wherein the training further comprises training the query model using machine learning based on the query model being built and trained by the SQL machine learning system using a SQL algorithm.

8. The computer-implemented method of claim 7, wherein the SQL algorithm uses analytics for query normalization based on a predicate analyzer, a foreign key, a SQL mutate, a SQL paring tree, a pattern sorting by sorting a SQL by a different pattern, a mutation pattern using at least one selected from a group consisting of a simple mutation pattern, a sub-query, a having clause, and generated SQLs using one of the extract join predicate, a reconstruct SQL, a sample result set, and the mutate SQL.

9. The computer-implemented method of claim 1, wherein the outputting further comprises outputting the commendation for the query tuning and the visual impact of the graph view of the recommendation for the query tuning to a user device for displaying in the graphical user interface (GUI) of the user device.

10. The computer-implemented method of claim 1, wherein the generated recommendation for the query tuning replaces an original query.

11. The computer-implemented method of claim 1, wherein the generated recommendation is appended to an original query.

12. A computer program product comprising one or more computer readable storage media having program instructions collectively stored on the one or more computer readable storage media, the program instructions executable to:
   analyze an incoming query for a database;
   train a query model using machine learning based on the analyzing of the incoming query;
   determine a model result based on the trained query model;
   extract a similar information query based on the model result;
   generate a recommendation for query tuning and a visual impact of the recommendation for the query tuning based on the extracting of the similar information query; and
   output the recommendation for the query tuning and the visual impact of the recommendation for the query tuning,
   wherein the visual impact comprises a graphical user interface (GUI) which includes an index scan, an index name, and a part in a data path of the incoming query and a new index and another index scan of the recommendation for the query.

13. The computer program product of claim 12, wherein the extracting further comprises extracting the at least one selected from a group consisting of a similar query, a similar query block, and a similar explain information query based on the at least one selected from the group consisting of the similar query, the similar query block, and the similar explain information query having a same distribution as the model result, and the training further comprises training the query model using machine learning based on the query model being built and trained by a structured query language (SQL) machine learning system using a SQL algorithm.

14. The computer program product of claim 13, wherein the analyzing further comprises analyzing database information and statistics from a database catalog, parameter statistics, and activities of the incoming query, and the SQL algorithm uses analytics for query normalization based on a SQL mutate.

15. The computer program product of claim 12, wherein the training further comprises training the query model using machine learning based on the query model being built and trained by at least one selected from a group consisting of a classification machine learning system, a support vector machine learning system, and a structured query language (SQL) machine learning system.

16. The computer program product of claim 15, wherein the training further comprises training the query model using machine learning based on the query model being built and trained by the classification machine learning system using a classification algorithm.

17. The computer program product of claim 15, wherein the training further comprises training the query model using machine learning based on the query model being built and trained by the support vector machine learning system using a vector algorithm.

18. The computer program product of claim 15, wherein the training further comprises training the query model using machine learning based on the query model being built and trained by the SQL machine learning system using a SQL algorithm.

19. The computer program product of claim 12, wherein the outputting further comprises outputting the commendation for the query tuning and the visual impact of the graph view of the recommendation for the query tuning to a user device for displaying in the graphical user interface (GUI) of the user device.

20. A system comprising:
a processor set, one or more computer readable storage media, and program instructions collectively stored on the one or more computer readable storage media, the program instructions executable to:
analyze an incoming query for a database;
train a query model using machine learning based on the analyzing of the incoming query;
determine a model result based on the trained query model;
modify an explain information query based on the model result;
generate a recommendation for query tuning and a visual impact of the recommendation for the query tuning based on the modified explain information query; and
output the recommendation for the query tuning and the visual impact of the recommendation for the query tuning,
wherein the visual impact comprises a graphical user interface (GUI) which includes an index scan, an index name, and a part in a data path of the incoming query and a new index and another index scan of the recommendation for the query.

* * * * *